United States Patent
Song et al.

(10) Patent No.: US 8,237,648 B2
(45) Date of Patent: Aug. 7, 2012

(54) LIQUID CRYSTAL DISPLAY DEVICE HAVING A SINGLE SOURCE PRINTED CIRCUIT BOARD

(75) Inventors: Hong Sung Song, Gyeongsangbuk-do (KR); Woong Ki Min, Daegu-si (KR); Byung Jin Choi, Gyeongsangbuk-do (KR); Su Hyuk Jang, Daegu-si (KR)

(73) Assignee: LG Display Co., Ltd., Seoul (KR)

( * ) Notice: Subject to any disclaimer, the term of this patent is extended or adjusted under 35 U.S.C. 154(b) by 928 days.

(21) Appl. No.: 12/149,909

(22) Filed: May 9, 2008

(65) Prior Publication Data

US 2008/0278428 A1     Nov. 13, 2008

(30) Foreign Application Priority Data

May 11, 2007   (KR) .......................... 10-2007-046120

(51) Int. Cl.
*G09G 3/36* (2006.01)
(52) U.S. Cl. ......................... 345/98; 345/209
(58) Field of Classification Search .................. 345/54, 345/87, 96, 209, 210, 98
See application file for complete search history.

(56) References Cited

U.S. PATENT DOCUMENTS

| | | | |
|---|---|---|---|
| 7,259,755 B1 * | 8/2007 | Ahn ............................. | 345/204 |
| 2002/0030652 A1 * | 3/2002 | Shibata et al. ................. | 345/87 |
| 2003/0169246 A1 * | 9/2003 | Park ............................. | 345/204 |
| 2004/0075800 A1 * | 4/2004 | Sah et al. ...................... | 349/149 |
| 2005/0078074 A1 * | 4/2005 | Morita ........................... | 345/96 |
| 2005/0219190 A1 * | 10/2005 | Lee et al. ....................... | 345/96 |
| 2006/0071897 A1 * | 4/2006 | Moon ............................ | 345/98 |
| 2007/0076159 A1 * | 4/2007 | Lee et al. ....................... | 349/149 |

FOREIGN PATENT DOCUMENTS

| | | |
|---|---|---|
| CN | 1940658 A | 4/2007 |
| TW | 565815 B | 12/2003 |

* cited by examiner

*Primary Examiner* — Chanh Nguyen
*Assistant Examiner* — Ram Mistry
(74) *Attorney, Agent, or Firm* — Morgan, Lewis & Bockius LLP

(57) ABSTRACT

A liquid crystal display (LCD) device having a simplified printed circuit board (PCB) is disclosed. The LCD device includes a first integrated circuit (IC) group operating in accordance with timing control signals to convert digital video data into data voltage and to supply the data voltage to a first data line group, and a second IC group receiving the timing control signals and the digital video data via a first source PCB and LOG wirings and operating in accordance with the timing control signals to convert the digital video data into the data voltage and to supply the data voltage to a second data line group Each IC of the first and second IC groups includes a polarity control signal (POL) generator for generating a polarity control signal to control a polarity of the data voltage, using a part of the timing control signals.

7 Claims, 15 Drawing Sheets

LIQUID CRYSTAL DISPLAY DEVICE HAVING A SINGLE SOURCE PRINTED CIRCUIT BOARD

This application claims the benefit of the Korean Patent Application No. 10-2007-0046120, filed on May 11, 2007 which is hereby incorporated by reference as if fully set forth herein.

BACKGROUND OF THE INVENTION

1. Field of the Invention

The present invention relates to a liquid crystal display (LCD) device, and more particularly, to an LCD device having a simplified printed circuit board (PCB).

2. Discussion of the Related Art

LCD devices display an image by controlling the light transmittance of liquid crystal cells in accordance with a video signal. Referring to FIG. 1, an active matrix type LCD device is illustrated. In such an active matrix type LCD device, data voltages, which are supplied to liquid crystal cells Clc, are switched by thin film transistors (TFTs) formed in respective liquid crystal cells Clc, for active control of data to achieve an enhancement in the display quality of a moving image. In FIG. 1, the reference character "Cst" designates a storage capacitor to maintain the data voltage charged in the associated liquid crystal cell Clc, the reference character "DL" designates a data line supplied with the data voltage, and the reference character "GL" designates a gate line supplied with a scan voltage.

For LCD devices, medium and large-size models as well as small-size models are being developed, in pace with the recent development of televisions and monitors with a large screen size. As shown in FIG. 2, such an LCD device includes a control PCB 20, a source PCB 22, a cable 21 connected between the source PCB 22 and the control PCB 20, and a plurality of source chip-on-films (COFs) 24 connected to the source PCB 22 and an LCD panel 25.

Each source COF 24 is electrically coupled to data pads of the source PCB 22 and LCD panel 25. A data integrated circuit (IC) 23 is mounted on each source COF 24.

Signal wirings are formed on the source PCB 22, to transfer digital video data and timing control signals from the control PCB 20.

A control circuit, a dater transfer circuit, etc. are mounted on the control PCB 20. The control PCB 20 supplies data to the data ICs 23, and supplies timing control signals to control operations of the data ICs 23 to the source PCB 22 via the cable 21.

As the LCD panel 25 has an increased size in the LCD device as shown in FIG. 2, the number of data lines and the number of source COFs 24 are correspondingly increased. As a result, the size of the source PCB 22 increases. In this case, there is a difficulty in aligning the source COFs 24 with the source PCB 22. Furthermore, the source PCB 22, which has an increased size as mentioned above, cannot be handled by existing automatic mounting equipment such as surface mount technology (SMT) equipment because the equipment is designed for a source PCB having a size smaller than the large-size source PCB 22. In addition, as the LCD device has an increased size, the number of circuit devices such as memories increases, and the number of output pins increases. For this reason, there is a problem of an increase in the manufacturing costs of the control PCB 20.

SUMMARY OF THE INVENTION

Accordingly, the present invention is directed to a liquid crystal display device that substantially obviates one or more problems due to limitations and disadvantages of the related art.

An object of the present invention is to provide a liquid crystal display device, which includes a source printed circuit board (PCB) having a divided structure, to reduce the size of a control PCB and the number of output pins.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprises: a liquid crystal display panel including a first data line group, a second data line group, and line-on-glass (LOG) wirings separated from the first and second data line groups; a first integrated circuit (IC) group operating in accordance with timing control signals, to convert digital video data into a data voltage, and to supply the data voltage to the first data line group; a first source printed circuit board (PCB), to which ICs included in the first IC group are coupled; a second IC group receiving the timing control signals and the digital video data via the first source PCB and the LOG wirings, and operating in accordance with the timing control signals, to convert the digital video data into the data voltage, and to supply the data voltage to the second data line group; a second PCB, to which ICs included in the second IC group are coupled; a timing controller including a single output port to output the timing control signals and the digital vide data; a control PCB, on which the timing controller is mounted; and a connector connected to the control PCB and the first source PCB, to transfer the timing control signals and the digital video data output through the single output port of the timing controller to the first source PCB, wherein each IC of the first and second IC groups includes a polarity control signal (POL) generator for generating a polarity control signal to control a polarity of the data voltage, using a part of the timing control signals.

The POL generator may generate the polarity control signal, using a gate start pulse indicating a start horizontal line, from which a scan operation starts in one vertical period for displaying one frame, and a source output enable signal enabling the digital video data to be output.

The POL generator may include a first D-flip-flop using the source output enable signal as an input clock, the first D-flip-flop generating a first polarity control signal inverted in logic state with reference to a rising edge of the source output enable signal generated for every vertical period, a second D-flip-flop using the gate start pulse as an input clock, the second D-flip-flop generating a select signal inverted in logic state with reference to the rising edge of the gate start pulse generated for every vertical period, and a multiplexer receiving the first polarity control signal and a second polarity control signal, which has a logic value opposite to the first polarity control signal, and alternately outputting the first and second polarity control signals at intervals of one vertical period, in response to the select signal.

The first D-flip-flop may include a non-inverting output terminal and an input terminal electrically coupled to each other via an inverter. The inverter may receive the first polarity control signal fed back from the non-inverting output terminal of the first D-flip-flop, and may output the fed-back signal as the second polarity control signal.

The control PCB may include a voltage generator for generating a driving voltage required to drive the liquid crystal display panel.

Each IC of the first and second IC groups may be mounted on one of a chip-on-film (COF) and a tape carrier package, on which dummy wirings for transferring the timing control signals, the digital video data, and the drive voltage are formed.

The timing controller may include a 2-port expander for separating digital video data RGB input at an input frequency into odd pixel data and even pixel data, and supplying the separated odd and even pixel data at a frequency corresponding to ½ of the input frequency, and a data modulator for modulating the odd and even pixel data from the 2-port expander, to reduce a swing width of the digital video data output from the single output port, the data modulator outputting the digital video data at a frequency corresponding to 2 times the input frequency.

The data modulator may modulate the digital video data in accordance with one of a mini low-voltage differential signaling (LVDS) scheme and a reduced swing differential signaling (RSDS) scheme.

Each of the first and second IC groups may further include a data recoverer for recovering the modulated digital video data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, the preferred embodiments of the present invention will be described with reference to FIGS. 3 to 16.

Figure 1:
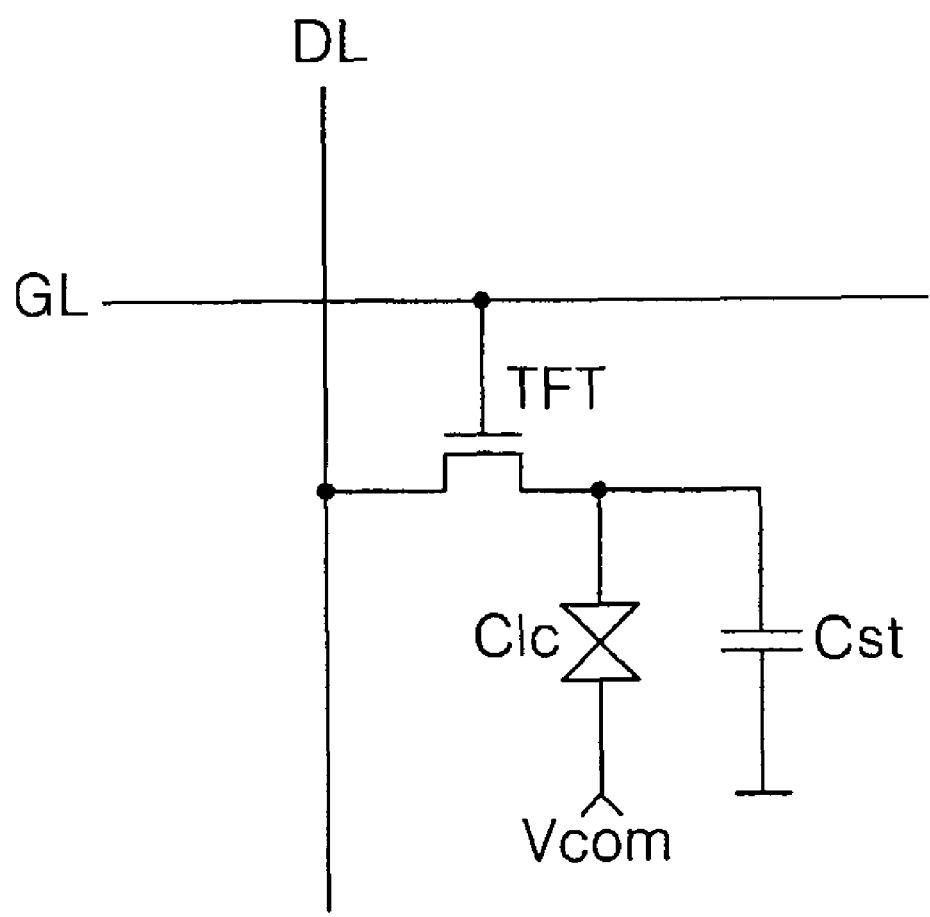
FIG. 1 is an equivalent circuit diagram illustrating one liquid crystal cell of a liquid crystal display (LCD) device.
Figure 2:
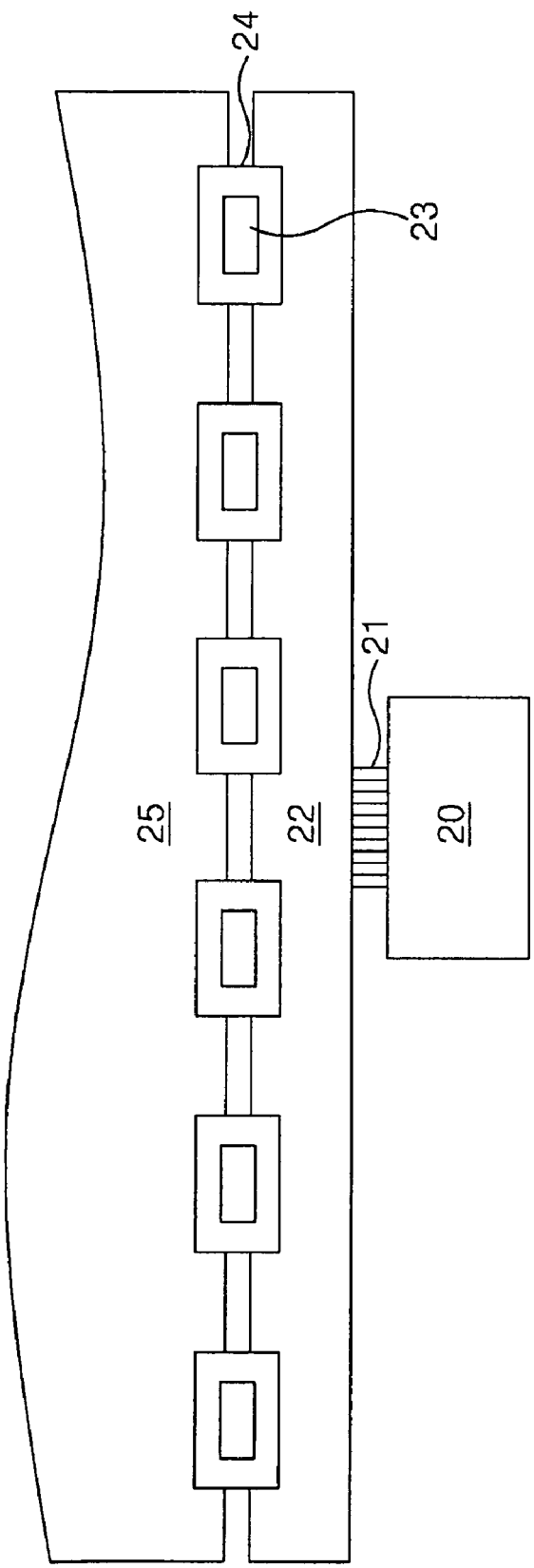
FIG. 2 is a view illustrating an LCD device having a single source PCB.
Figure 3:
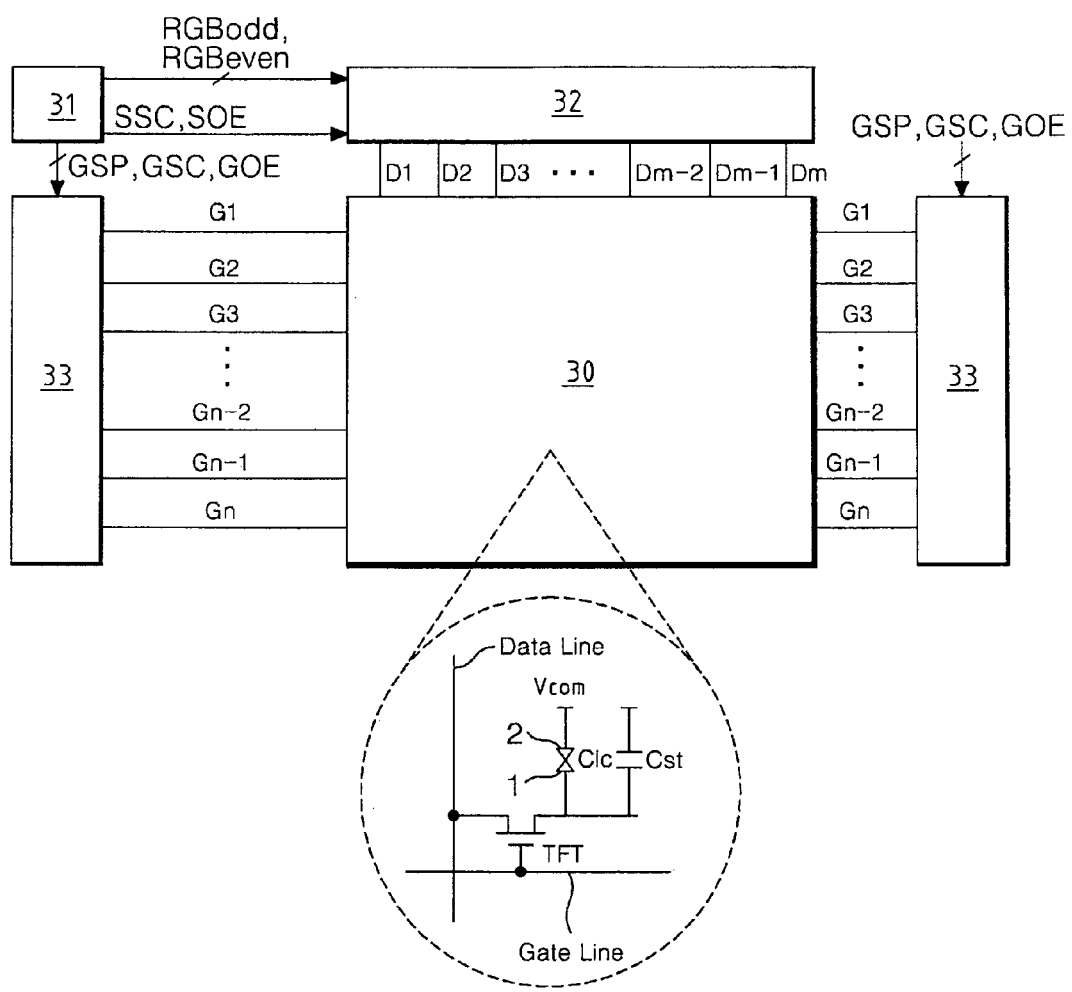
FIG. 3 is a block diagram illustrating an LCD device according to an exemplary embodiment of the present invention.

Referring to FIG. 3, a liquid crystal display (LCD) device according to an exemplary embodiment of the present invention is illustrated. The LCD device includes an LCD panel 30, a timing controller 31, a data driving circuit 32, and a gate driving circuit 33.

The LCD panel 30 includes two glass substrates, between which liquid crystal molecules are sealed. The LCD panel 30 also includes m×n liquid crystal cells Clc arranged in a matrix form on an intersection structure of m data lines D1 to Dm and n gate lines G1 to Gn.

Formed on a lower one of the glass substrates of the LCD panel 30 are the data lines D1 to Dm, the gate lines G1 to Gn, thin film transistors (TFTs), pixel electrodes 1 of respective liquid crystal cells Clc coupled to the TFTs, and storage capacitors Cst. line-on-glass (LOG) wirings are formed on the lower glass substrate of the LCD panel 30, to transfer digital video data, timing control signals, drive voltages, etc. between source PCBs, which will be described later.

A black matrix, color filters, and common electrodes 2 are formed on the upper glass substrate of the LCD panel 30. In a vertical electric field driving system such as a twisted nematic (TN) mode or a vertical alignment (VA) mode, the common electrodes 2 are formed on the upper glass substrate, as described above. On the other hand, in a horizontal electric field driving system such as an in-plane switching (IPS) mode or a fringe field switching (FFS) mode, the common electrodes 2 are formed on the lower glass substrate, together with the pixel electrodes 1. Polarizing plates having optical axes orthogonal to each other are attached to the upper and lower glass substrates, respectively. An alignment film is formed at an interface between each polarizing plate and the liquid crystals, to set a pre-tilt angle of the liquid crystals.

The timing controller 31 receives timing signals such as vertical/horizontal synchronizing signals, a data enable signal, and a clock signal, and generates data timing control signals to control the operation timing of the data driving circuit 32 and gate timing control signals to control the operation timing of the gate driving circuit 33, based on the received timing signals. The gate timing control signals include a gate start pulse GSP, a gate shift clock signal GSC, a gate output enable signal GOE, etc. The gate start pulse GSP is a timing control signal indicating a first scan pulse to be supplied to a start horizontal line, from which a scanning operation starts in one vertical period for displaying one frame. The gate shift clock signal GSC is a timing control signal, which is input to shift registers included in the gate driving circuit 33, to sequentially shift the gate start pulse GSP. The gate shift clock signal GSC has a pulse width corresponding to an ON period of the TFTs. The gate output enable signal GOE enables an output from the gate driving circuit 33. The data timing control signals include a source sampling clock SSC, a source output enable signal SOE, etc. The source sampling clock SSC enables a data latch operation of the data driving circuit 32 based on a rising or falling edge. The source output enable signal SOE enables an output from the data driving circuit 32. The timing controller 31 also separates digital video data into odd pixel data RGBodd and even pixel data RGBeven, and supplies the separated data to the data driving circuit 32. In order to reduce electromagnetic interference (EMI) in a data transfer path and to reduce the swing width of data voltages, the timing controller modulates data RGBodd and RGBeven in accordance with a mini low-voltage differential signaling (LVDS) scheme or a reduced swing differential signaling (RSDS) scheme, and supplies the modulated data to the data driving circuit 32.

The data driving circuit 32 generates a polarity control signal POL, using the gate start pulse GSP and source output enable signal SOE from the timing controller 31. The polarity control signal POL indicates the polarities of data voltages to be supplied to liquid crystal cell Clc. The data driving circuit 32 also latches the digital video data RGBodd and RGBeven under the control of the timing controller 31. The data driving circuit 32 also converts the latched digital video data RGBodd and RGBeven into positive/negative analog gamma compensating voltages in accordance with the polarity control signal POL, and thus generates positive/negative analog data voltages. The data voltages from the data driving circuit 32 are supplied to the data lines D1 to Dm.

The gate driving circuit 33 includes a plurality of gate integrated circuits (ICs) each including a shift register, a level shifter for converting an output signal of the shift register into a signal having a swing width suitable for the driving of the TFTs of the associated liquid crystal cells, and an output buffer coupled between the level shifter and an associated one of the gate lines G1 to Gn. The gate driving circuit 33 sequentially supplies a scan pulse to the gate lines G1 to Gn. Each gate IC of the gate driving circuit 33 is mounted on a chip-on-film (COF) or a tape carrier package (TCP), and is coupled to gate pads formed on the lower glass substrate of the LCD panel 30. Alternatively, each gate IC of the gate driving circuit 33 may be directly bonded to the lower glass substrate of the LCD panel 30 in accordance with a chip-on-glass process. Meanwhile, the gate driving circuit 33 may be directly formed on the lower glass substrate of the LCD panel 30, simultaneously with the data lines D1 to Dm, gate lines G1 to Gn, and TFTs, which constitute a pixel array, using a gate-in-panel process. The gate driving circuit 33 is arranged at opposite lateral sides of the LCD panel 30, to meet the large-size tendency of the LCD panel 30. In accordance with this arrangement, it is possible to prevent scan pulses from being distorted due to RC delay, in a large-size LCD panel configured to supply scan pulses through long gate lines.

Figure 4:
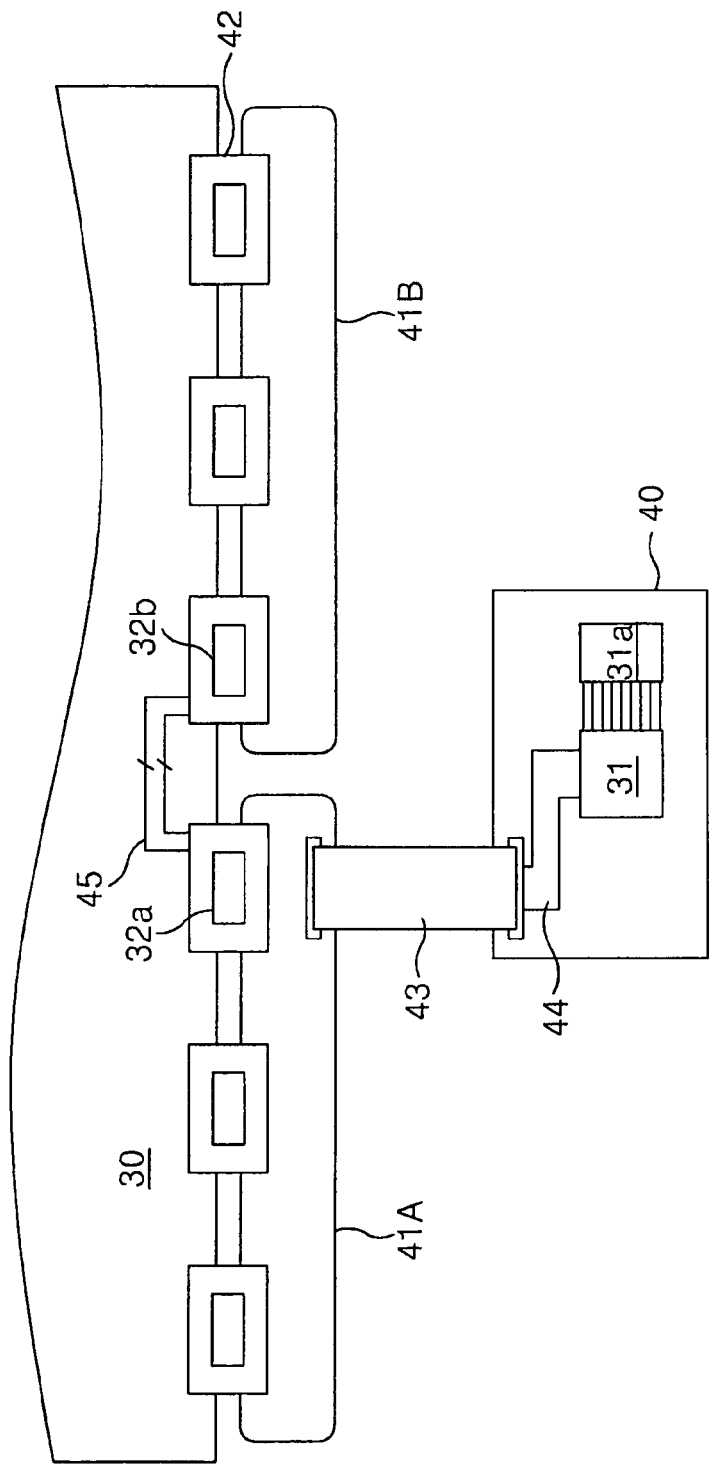
FIG. 4 is a view concretely illustrating a connection structure between a timing controller and each data IC shown in FIG. 3.
Figure 5:
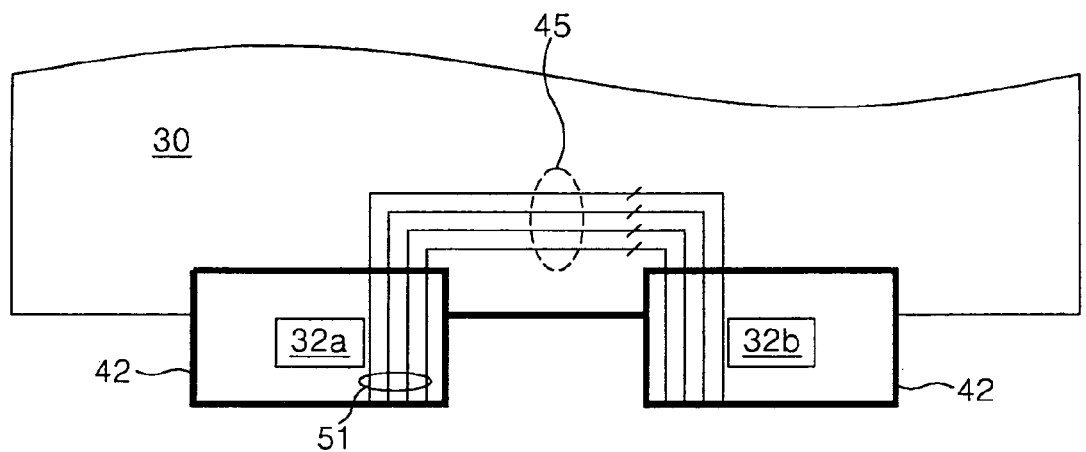
FIG. 5 is a plan view illustrating dummy wirings formed on a source chip-on-film (COF) and line-on-glass (LOG) wirings formed on a substrate of an LCD panel.

FIG. 4 is a view illustrating an assembled state of the LCD panel 30, data driving circuit 32, and timing controller 31 shown in FIG. 3. FIG. 5 is a view illustrating dummy wirings formed on a source COF and LOG wirings formed on one substrate of the LCD panel 30.

Referring to FIGS. 4 and 5, the data driving circuit 32 includes a plurality of first data ICs 32a and a plurality of second data ICs 32b.

The data ICs 32a and 32b are mounted on source COFs 42, respectively. Each source COF 42 may be substituted by a TCP. The source COFs 42 are connected to a source PCB, which are divided into two sections, namely, a first source PCB 41A and a second source PCB 41B. That is, two groups of the source COFs 42 are connected to the first and second source PCBs 41A and 41B, respectively. Each source COF 42 has an input terminal electrically coupled to one of output terminals of the associated first or second source PCB 41A or 41B. Each source COF 42 also has an output terminal electrically connected to one of the data pads formed on the lower glass substrate of the LCD panel 30. As shown in FIG. 5, dummy wirings 51 are formed on each source COF 42, to transfer timing control signals and a drive voltage. LOG wirings 45 are formed on the lower glass substrate of the LCD panel 30 between the source COF 42 neighboring to the second source PCB 41B among the source COFs 42 connected to the first source PCB 41A and the source COF 42 neighboring to the first source PCB 41A among the source COFs 42 connected to the second source PCB 41B. The LOG wirings 45 function to transfer digital video data RGBodd and RGBeven, timing control signals including a carry signal, and drive voltages, respectively. In the LCD device according to the present invention, one flexible flat cable (FFC) 43 is eliminated in accordance with the use of the LOG wirings 45. Accordingly, it is possible to simplify the connection structure of the source PCBs 41A and 41B to a control PCB 40, and thus to reduce the number of elements used. Meanwhile, it is necessary to minimize the number of LOG wirings 45 because the formation area of LOG wirings 45 is limited due to the characteristics of processes used. To this end, in the LCD device according to the present invention, the LOG wiring transferring the polarity control signal POL among the LOG wirings 45 is eliminated. In place, each of the data ICs 32a and 32b generates the polarity control signal POL, using the gate start pulse GSP and source output enable signal SOE. This will be described later in detail with reference to FIGS. 11 to 14. The area, from which the LOG wiring transferring the polarity control signal POL is removed, can be used for an increase in the line width of LOG wirings transferring drive voltages. In accordance with the increased line width of the LOG wirings transferring drive voltages, it is possible to reduce a voltage drop caused by the LOG wirings, and thus to minimize the difference in gamma compensating voltages VGH and VGL between the first and second source PCBs 41A and 41B.

Bus wirings to transfer digital video data RGBodd and RGBeven, bus wirings to transfer gate and data timing control signals, and bus wirings to transfer drive voltages are formed on each of the first and second source PCBs 41A and 41B.

The first source PCB 41A has input terminals electrically coupled to connecting wirings 44 formed on the control PCB 40 via an FFC 43. On the other hand, the second source PCB 41B is not connected to the control PCB 40. The source PCBs 41A and 41B are electrically coupled with each other via the LOG wirings 45 and source COFs 42. Accordingly, the first source PCB 41A receives digital video data RGBodd and RGBeven, timing control signals, and drive voltages from the control PCB 40 via the connecting wirings 44 formed on the control PCB 40. The second source PCB 41B receives digital video data RGBodd and RGBeven, timing control signals, and drive voltages from the first source PCB 41A via the LOG wirings 45 and source COFs 42. The gate timing control signals supplied to the first source PCB 41A are supplied to the gate driving circuit arranged at the right side of the LCD panel 30 via the bus wirings formed on the first source PCB 41A. The gate timing control signals supplied to the second source PCB 41B via the LOG wirings 45 are supplied to the gate driving circuit arranged at the left side of the LCD panel 30 via the bus wirings formed on the second source PCB 41B.

The connecting wirings 44 are formed on the control PCB 40, together with the timing controller 31, an EEPROM 31a, and a circuit such as a DC-DC converter functioning to generate drive voltages for the LCD display panel 30. The drive voltages generated from the DC-DC converter include a gate high voltage Vgh, a gate low voltage Vgl, a common voltage Vcom, a high-level supply voltage Vdd, a low-level supply voltage Vss, and a plurality of gamma reference voltages divided between the high-level supply voltage Vdd and the low-level supply voltage Vss. The gamma reference voltages are sub-divided into analog gamma compensating voltages such that the number of analog gamma compensating voltages corresponds to the number of gray scale values representable by bits of digital video data RGBodd and RGBeven in the data ICs 32a and 32b. The gate high voltage Vgh and gate low voltage Vgl are high and low swing voltages of a scan pulse, respectively. EEPROM 31a is stored with waveform option information as to timing control signals generated from the timing controller 31, for different modes. Thus, the EEPROM 31a supplies waveform information for a selected mode to the timing controller 31, in accordance with a command from the user. The timing controller 31 generates timing control signals corresponding to the selected mode, based on the waveform option information from the EEPROM 31a. Thus, different timing control signals are generated from the timing controller 31 in accordance with different modes, respectively.

Figure 6:
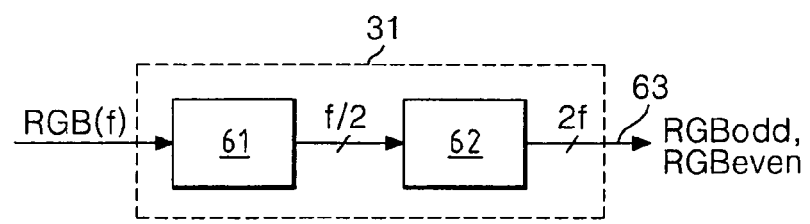
FIG. 6 is a block diagram illustrating a detailed configuration of a data processor included in the timing controller shown in FIGS. 3 and 4.

The connecting wirings 44 formed on the control PCB 40 connect a single output port 63 of the timing controller 31 to the FFC 43. The single output port 63 of the timing controller 31 is shown in FIG. 6. Via the connecting wirings 44, digital video data RGBodd and RGBeven and timing control signals, and drive voltages generated from the DC-DC converter are sent to the FFC 43.

FIG. 6 is a view illustrating a data processing part of the timing controller 31.

Referring to FIG. 6, the timing controller 31 includes a 2-port expander 61 and a data modulator 62.

The 2-port expander 61 separates digital video data RGB from a main board of the system at a certain input frequency f into odd pixel data RGBodd and even pixel data RGBeven, and supplies the separated data RGBodd and RGBeven to the data modulator 62 at a ½ frequency f/2. The reason why the transfer frequency is reduced to ½ is that it is possible to reduce electromagnetic interference (EMI) at the ½ frequency. The swing width of the data RGBodd and RGBeven output from the 2-port expander 61 is relatively wide, for example, about 3.3V corresponding to a transistor-to-transistor (TTL) level.

The data modulator 62 modulates the data RGBodd and RGBeven sent from the 2-port expander 61, to reduce the swing width of the data RGBodd and RGBeven to about 300 to 600 mV. The data modulator 62 also increases the frequency of the data RGBodd and RGBeven to 2 times the input frequency f, namely, to a frequency 2f, in accordance with a 4-fold-accelerated mini LVDS clock. Although the frequency of the data RGBodd and RGBeven output from the data modulator 62 increases to 2 times the input frequency f, namely, to the frequency 2f, there is no or little EMI increase because the swing width of the data RGBodd and RGBeven has a considerably-reduced value of about 300 to 600 mV. The data modulator 62 outputs signals including 3 pairs of odd pixel data RGBodd, 3 pairs of even pixel data RGBeven, and a pair of mini clocks mini CLK. Each signal pair includes a positive signal and a negative signal. Meanwhile, the data modulator 62 may perform the data modulation in accordance with an RSDS scheme.

Figure 7:
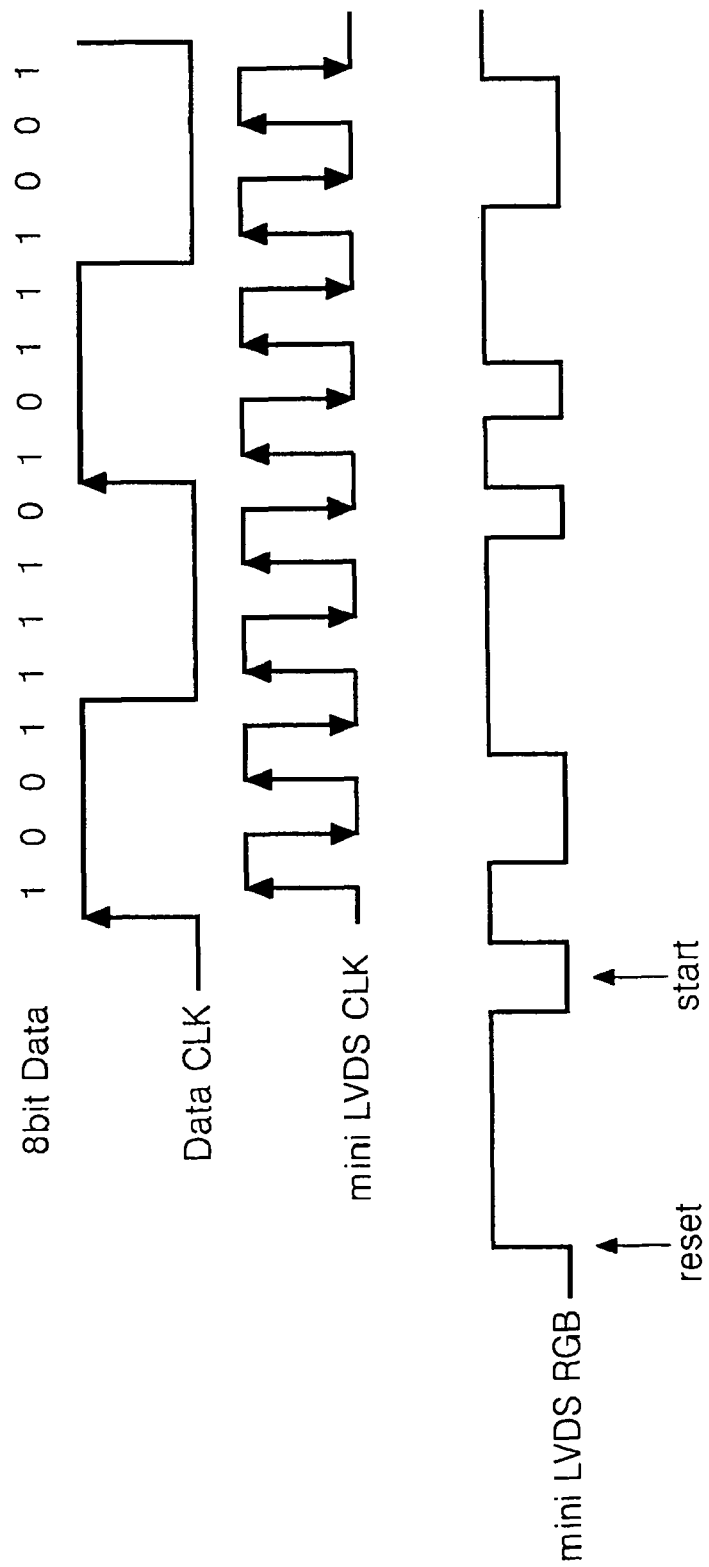
FIGS. 7 and 8 are waveform diagrams illustrating an example of outputs from a data modulator shown in FIG. 6.
Figure 8:
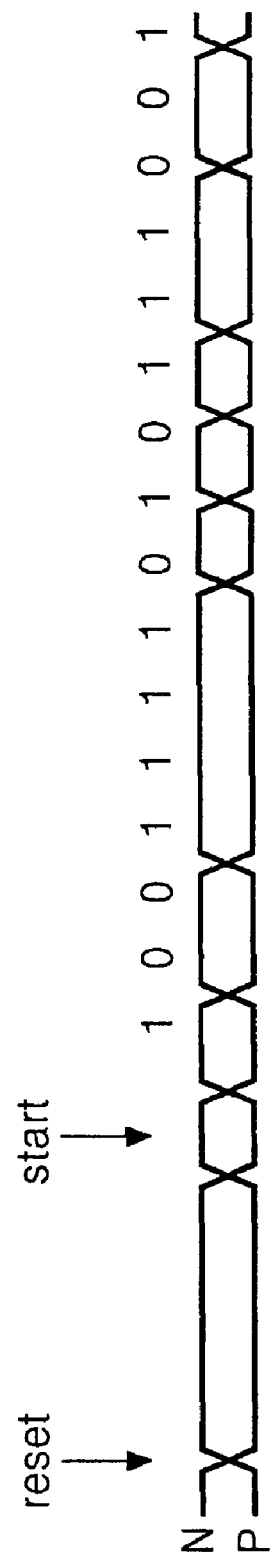

FIGS. 7 and 8 illustrate an example of data output from the data modulator 62. The illustrated example corresponds to an example of data modulated in a min LVDS scheme.

In FIG. 7, "Data CLK" represents a data clock generated from the main board of the system, and "mini LVDS CLK" represents a clock generated from the data modulator 62, and then transferred together with data. Also, "mini LVDS RGB" represents a positive data waveform modulated by the data modulator 62 such that the positive data waveform includes a reset waveform. The data modulator 62 also generates a negative data waveform having a phase opposite to the positive data waveform. Thus, the data modulator 62 transfers 6 data pairs each including a positive data waveform P and a negative data waveform N, and one min LVDS clock pair to the data ICs 32a and 32b. The data IC, which samples the first data, recognizes a start pulse start following a reset waveform reset, as a data sampling start point, and begins to sample data following the start pulse start. Accordingly, it is unnecessary for the timing controller 31 to supply a source start pulse SSP through a separate wiring.

Figure 9:
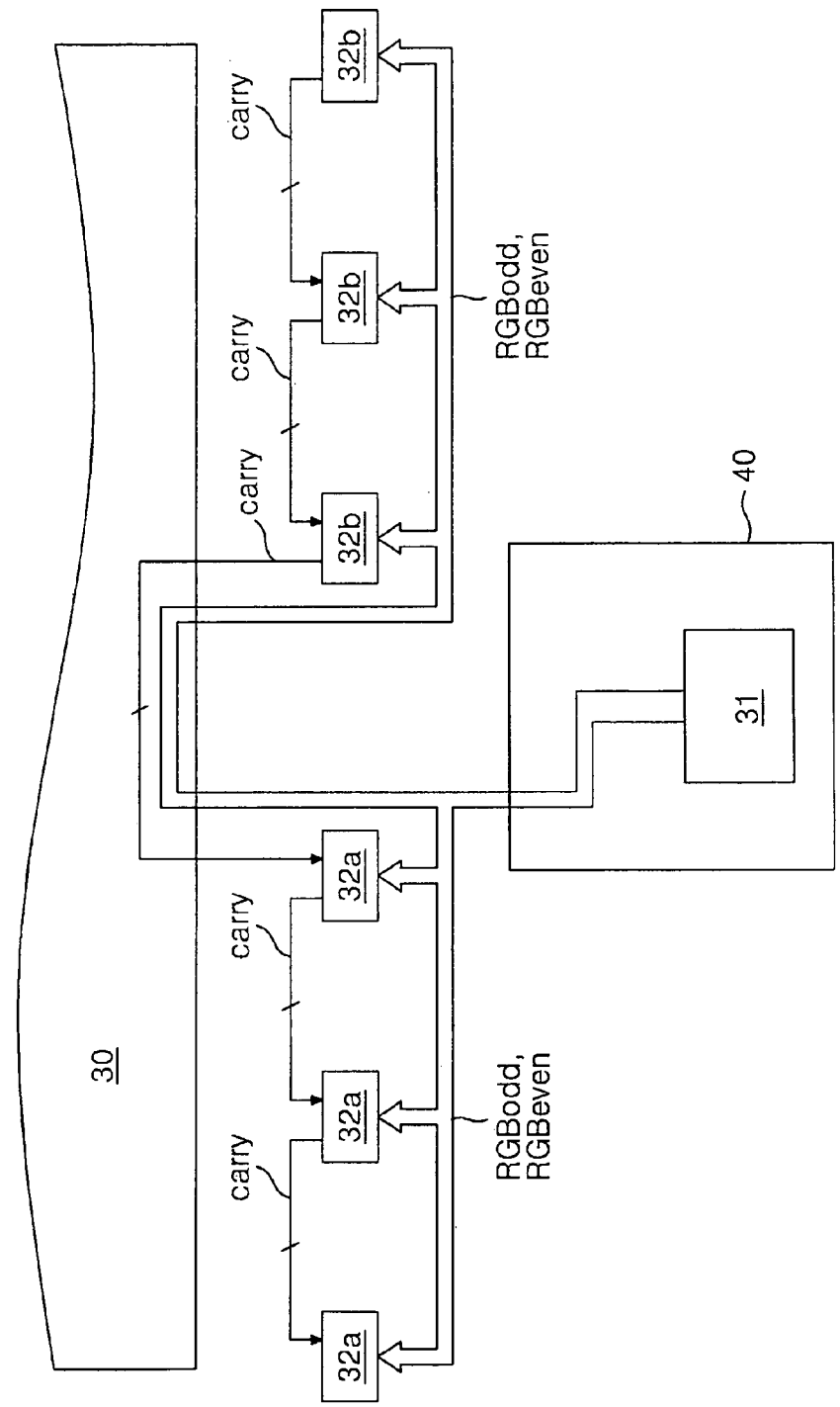
FIG. 9 is a view illustrating signal a transfer path established between the timing controller and each data IC shown in FIG. 4.

FIG. 9 illustrates signal transfer paths established between the timing controller 31 and respective data ICs 32a and 32b.

Referring to FIG. 9, right data RGBodd and RGBeven from among digital video data modulated by the timing controller 31 in the mini LVDS or RSDS scheme are transferred to the first data ICs 32a coupled to the first source PCB 41A via the single output port 63 of the timing controller 31, the connecting wirings 44, and the FFC 43. The right data RGBodd and RGBeven will be displayed on a right half portion of the screen of the LCD panel 30. On the other hand, left data RGBodd and RGBeven modulated by the timing controller 31 in the mini LVDS or RSDS scheme are transferred to the second data ICs 32b coupled to the second source PCB 41B via the single output port 63 of the timing controller 31, the connecting wirings 44, the first source PCB 41A, the dummy wirings 51 of the source COF 42, and the LOG wirings 45 of the LCD panel 30. The left data RGBodd and RGBeven will be displayed on a left half portion of the screen of the LCD panel 30.

The data timing control signals generated from the timing controller 31 are transferred to the first data ICs 32a coupled to the first source PCB 41A via the single output port 63 of the timing controller 31, the connecting wirings 44, and the FFC 43. The data timing control signals are also transferred to the second data ICs 32b coupled to the second source PCB 41B via the single output port 63 of the timing controller 31, the connecting wirings 44, the first source PCB 41A, the dummy wirings 51 of the source COF 42, and the LOG wirings 45 of the LCD panel 30.

As shown in FIGS. 7 and 8, the leftmost data IC 32b, which samples first data following a start pulse, generates a carry signal carry indicating the sampling timing of data following the first data, after sampling the first data in an amount corresponding to the number of output channels of the leftmost data IC 32b. The leftmost data IC 32b then supplies the carry signal carry to the data IC 32b just neighboring to the leftmost data IC 32b in a right direction. In this manner, the carry signal carry is sequentially transferred to neighboring data ICs 32b. The transfer of the carry signal carry between the first and second source PCBs 41A and 41B is achieved through the LOG wirings 45 formed on the LCD panel 30.

Meanwhile, the data sampling direction of the data ICs 32a and 32b may be changed to an opposite direction. In this case, the transfer of the carry signal carry between the first and second source PCBs 41A and 41B is carried out in an opposite direction.

The drive voltages generated from the DC-DC converter mounted on the control PCB 40 are transferred to the first data ICs 32a coupled to the first source PCB 41A via respective output terminals of the DC-DC converter, the connecting wirings 44, and the FFC 43. The drive voltages are also transferred to the second data ICs 32b coupled to the second source PCB 41B via respective output terminals of the DC-DC converter, the connecting wirings 44, the first source PCB 41A, the dummy wirings 51 of the source COF 42, and the LOG wirings 45 of the LCD panel 30.

Figure 10:
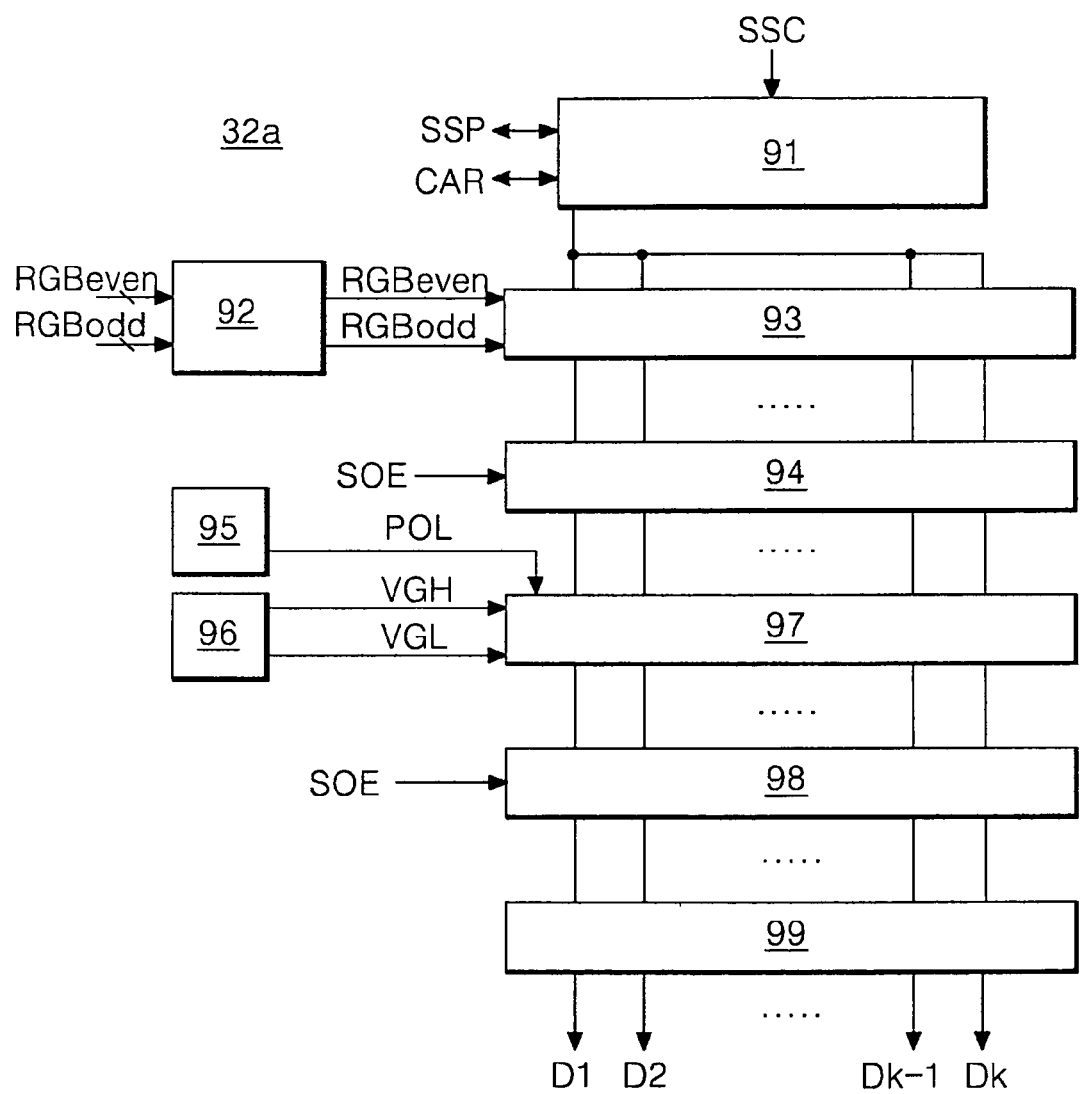
FIG. 10 is a block diagram illustrating a detailed configuration of one data IC shown in FIG. 4.
Figure 11:
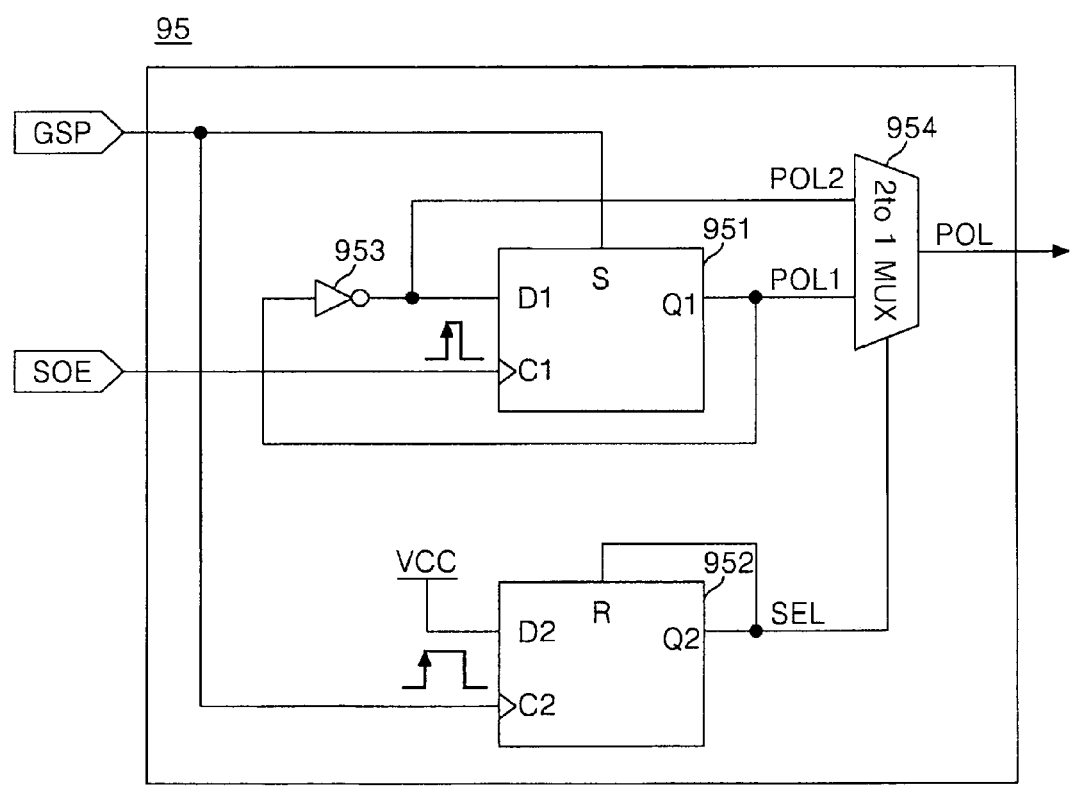
FIG. 11 is a circuit diagram illustrating an example of a POL generator shown in FIG. 10.
Figure 12:
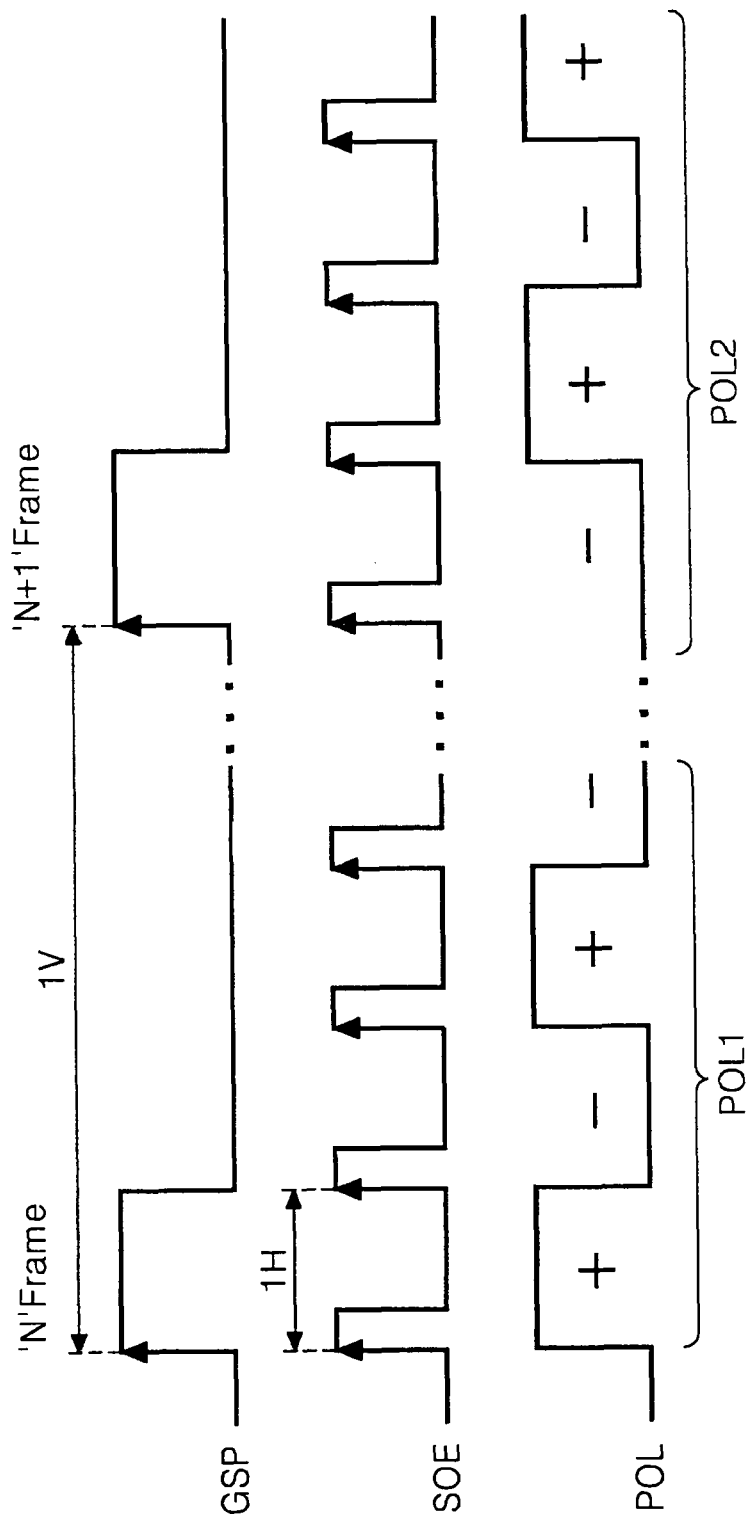
FIG. 12 is a waveform diagram depicting a polarity control signal generated in the example of FIG. 11.

FIGS. 10 to 12 are circuit diagrams illustrating a detailed configuration of one first data IC 32a.

Referring to FIGS. 10 to 12, each first data IC 32a includes a shift register 91, a data recoverer 92, a first latch array 93, a second latch array 94, a POL generator 95, a gamma compensating voltage generator 96, a digital/analog converter (DAC) 97, a charge share circuit 98, and an output circuit 99.

The data recoverer 92 temporarily stores the odd pixel data RGBodd and even pixel data RGBeven separated by the timing controller 31, and recovers the modulated data in accordance with a demodulation scheme corresponding to the modulation scheme applied to the data by the timing controller 31. For example, as shown in FIG. 8, the data recoverer 92 recovers data in such a manner that it generates "1" for positive data having a high logic value, and generates "0" for positive data having a low logic value. The data recoverer 92 supplies the recovered data RGBodd and RGBeven to the first latch array 93.

The shift register 91 shifts a sampling signal in accordance with the source sampling clock SSC. The shift register 91 also generates a carry signal carry when the amount of data supplied to the shift register 91 exceeds the number of latches in the first latch array 93. The shift register 91 of the first data IC 32a, which samples first data, determines a reset signal supplied via a data bus before the supply of data, and data supplied after a start pulse, as data to be first sampled.

The first latch array 93 samples the digital video data RGBeven and RGBodd, in response to sampling signals sequentially input from the shift register 91, and latches the sampled digital video data RGBeven and RGBodd for every horizontal line, and simultaneously outputs the latched one horizontal line data.

The second latch array 94 latches data RGBeven and RGBodd of one horizontal line input from the first latch array 93, and outputs the latched digital video data RGBeven and RGBodd in a low logic period of the source output enable signal SOE, simultaneously with the second latch arrays 94 of the remaining data ICs.

As shown in FIGS. 11 and 12, the POL generator 95 includes a first D-flip-flop 951, a second D-flip-flop 952, an inverter 953, and a multiplexer 954.

The first D-flip-flop 951 uses the source output enable signal SOE, which rises at intervals of one horizontal period 1H, as an input clock C1. The first D-flip-flop 951 has a non-inverting output terminal Q1 connected to an input terminal D1 of the first D-flip-flop 951 via the inverter 953. The gate start pulse GSP is supplied to a set terminal S of the first D-flip-flop 951. The first D-flip-flop 951 initializes the polarity of a first polarity control signal POLL output from the non-inverting output terminal Q1 to "+", in response to the gate start pulse GSP. The inverter 953 inverts the first polarity control signal POLL fed back from the non-inverting output terminal Q1 of the first D-flip-flop 951, and inputs the inverted signal to the input terminal D of the first D-flip-flop 951. The first D-flip-flop 951 latches the inverted input from the first polarity control signal POL1, and outputs the latched signal in synchronism with a rising edge of the source output enable signal SOE. Thus, the first D-flip-flop 951 functions to delay the inverted signal from the first polarity control signal POL1 for one horizontal period. As a result, the logic value of the first polarity control signal POL1 is inverted at intervals of one horizontal period. On the contrary, the second polarity control signal POL2 has an opposite phase to the first polarity control signal POL1 because it is not delayed by the first D-flip-flop 951.

The second D-flip-flop 952 uses the gate start pulse GSP, which rises at intervals of one horizontal period 1V, as an input clock C2. The second D-flip-flop 952 has a non-inverting output terminal Q2 connected to a reset terminal R of the second D-flip-flop 952 and a control terminal of the multiplexer 954. The second D-flip-flop 952 also has an input terminal D2 connected to a D-flip-flop. In accordance with this configuration, the second D-flip-flop 952 outputs a select signal SEL with reference to a rising edge of the gate start pulse GSP in such a manner that it outputs a reset signal when an output generated before the rising edge of the gate start pulse GSP is "1", and outputs a voltage from the high-level voltage source VCC when an output generated after the rising edge of the gate start pulse GSP is "0". Thus, the second D-flip-flop 952 inverts the logic value of the select signal SEL output from the non-inverting output terminal Q2 at intervals of one vertical period.

The multiplexer 954 alternately selects the first and second polarity control signals POL1 and POL2 at intervals of one vertical period, in response to the select signal SEL from the second D-flip-flop 952, and outputs the selected signal as a final polarity control signal POL. Thus, the final polarity control signal POL is inverted in logic value not only at intervals of one horizontal period, but also at intervals of one vertical period, as shown in FIG. 12.

Figure 13:
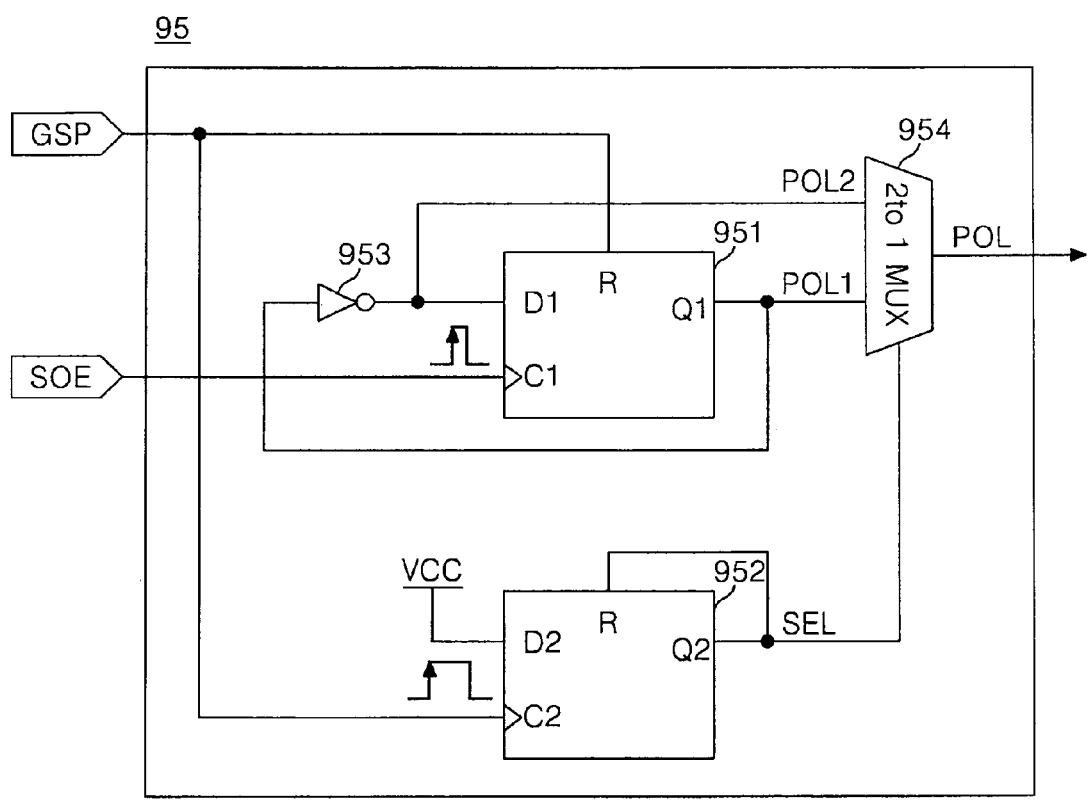
FIG. 13 is a circuit diagram illustrating another example of the POL generating circuit shown in FIG. 10.
Figure 14:
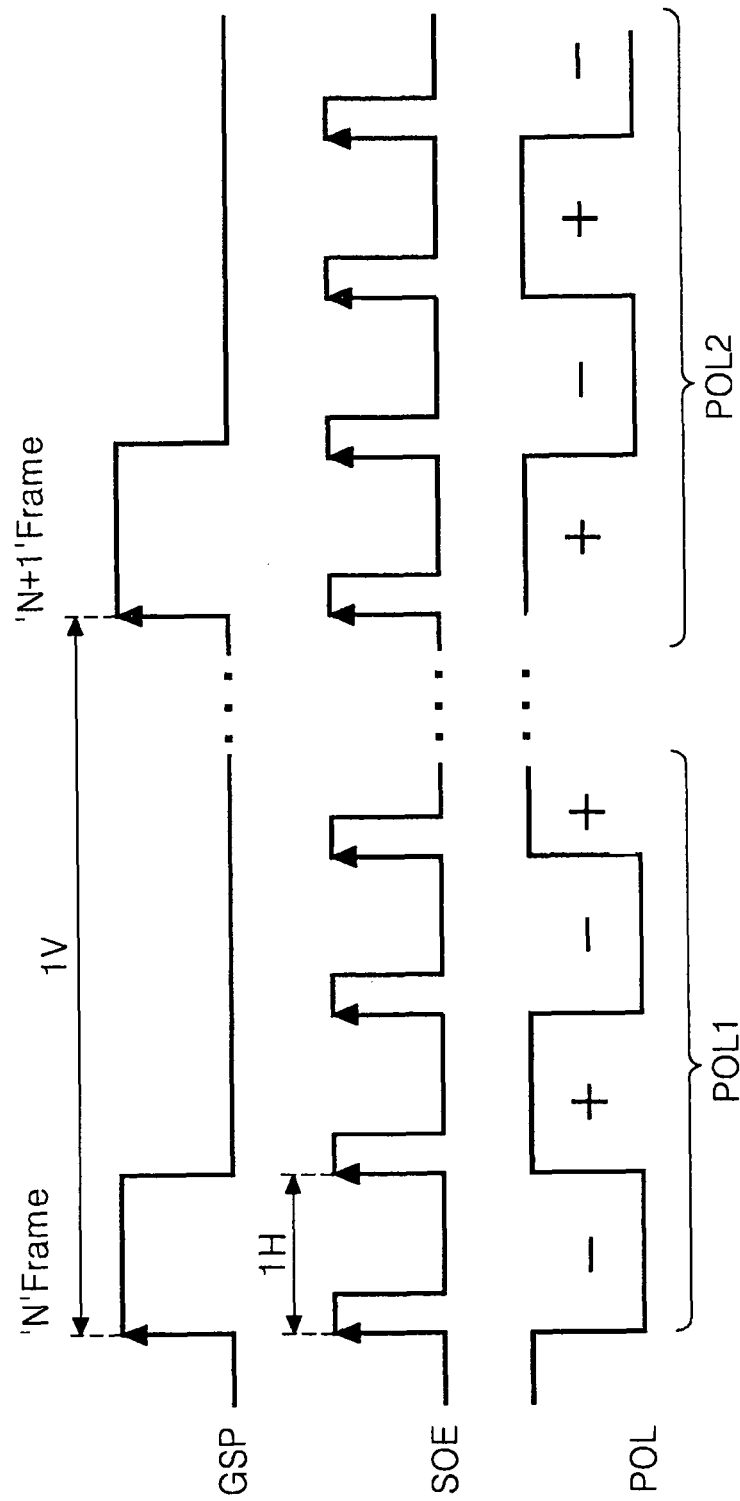
FIG. 14 is a waveform diagram illustrating a polarity control signal generated in the example of FIG. 13.

Meanwhile, the POL generator 95 may be implemented as shown in FIG. 13. In the case of FIG. 13, the first D-flip-flop 951 initializes the first polarity control signal POL1 output from the non-inverting output terminal Q1 to "−", in response to the gate start pulse GSP, to generate a final polarity control signal POL as shown in FIG. 14.

Figure 15:
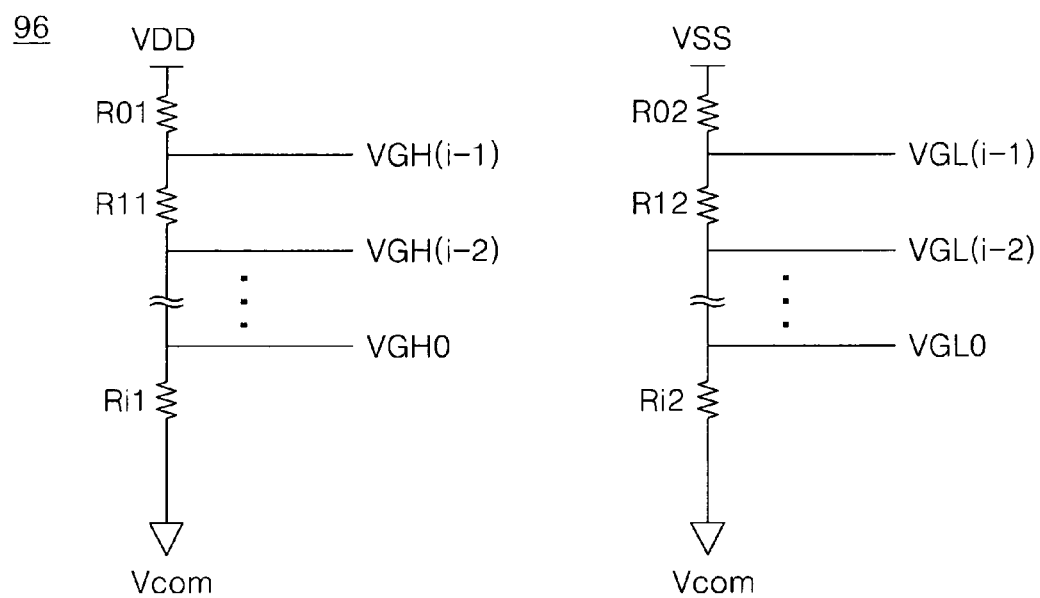
FIG. 15 is a block diagram illustrating a detailed configuration of a gamma compensating voltage generator shown in FIG. 10.

As shown in FIG. 15, the gamma compensating voltage generator 96 sub-divides a plurality of gamma reference voltages, which are divided between a high-level supply voltage Vdd and a low-level supply voltage Vss, such that the number of the sub-divided gamma reference voltages corresponds to the number of gray scale values "i" representable by bits of digital video data RGBodd and RGBeven. The gamma compensating value generator 96 generates positive gamma compensating voltages VGH0 to VGH(i−1) corresponding to respective gray scale values, and negative gamma compensating voltages VGL0 to VGL(i−1) corresponding to respective gray scale values. To this end, the gamma compensating voltage generator 95 includes a resister string including a plurality of voltage-dividing resisters R01 to Ri1 and a plurality of voltage-dividing resisters R02 to Ri2 connected in series between the high-level supply voltage Vdd and the low-level supply voltage Vss.

Figure 16:
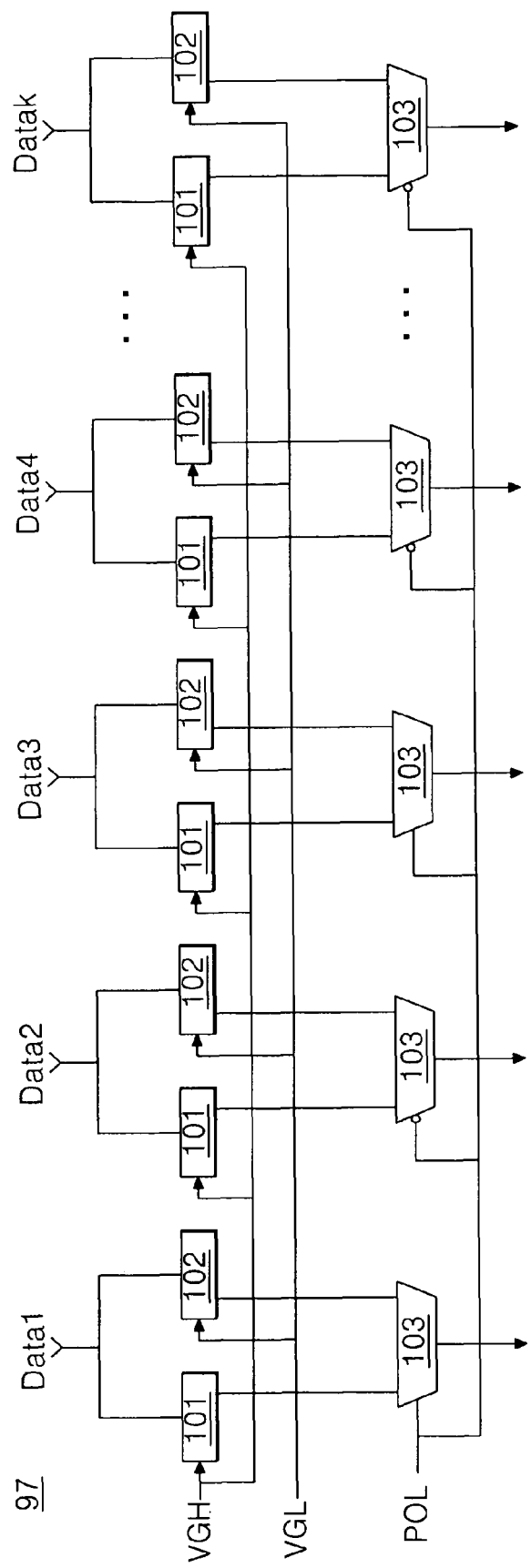
FIG. 16 is a block diagram illustrating a detailed configuration of a digital/analog converter (DAC) shown in FIG. 10.

As shown in FIG. 16, the DAC 97 includes P-decoders (PDECs) 101, to which a positive gamma compensating voltage VGH, N-decoders (NDECs) 102, to which a negative gamma compensating voltage VGL, and multiplexers 103 each coupled to an associated one of the PDECs 101 and an associated one of the NDECs 102, to select an output from the associated PDEC 101 or an output from the associated NDEC 102 in response to the polarity control signal POL. Each PDEC 101 decodes digital video data RGBeven and RGBodd input from the associated second latch array 94, and outputs a positive gamma compensating voltage VGH corresponding to the gray scale value of the decoded digital video data. Each NDEC 102 decodes digital video data RGBeven and RGBodd input from the associated second latch array 94, and outputs a negative gamma compensating voltage VGL corresponding to the gray scale value of the decoded digital video data. Each multiplexer 103 selects the positive gamma compensating voltage VGH or negative gamma compensating voltage VGL in response to the polarity control signal POL.

The charge share circuit 98 short-circuits neighboring data output channels in a high-logic period of the source output enable signal SOE, and thus outputs a mean voltage of neighboring data voltages, as a charge share voltage. The charge share circuit 98 also supplies a common voltage Vcom to the data output channels in the high-logic period of the source output enable signal SOE, to reduce the data voltage swing width between the positive and negative data voltages.

The output circuit 99 includes a buffer to minimize signal attenuation of the analog data voltages supplied to the data lines D1 to Dk.

Each second data IC 32b substantially has the same configuration as each first data IC 32a.

As apparent from the above description, the LCD device according to the present invention includes a divided source PCB structure, and a single output port for the output port of the timing controller thereof, thereby achieving a reduction in the size of the control PCB thereof and a reduction in the number of output pins.

In the LCD device according to the present invention, it is also possible to eliminate one FFC, using LOG wirings formed on an LCD panel, and thus to simplify the connection structure between the source PCB and the control PCB and to reduce the number of elements used.

In addition, it is possible to eliminate LOG wirings used to transfer polarity control signals by generating the polarity control signals in data ICs, using a part of timing control signals. Thus, in the LCD device according to the present invention, the load of the timing controller can be reduced. Also, the area, from which the LOG wirings are removed, can be used for an increase in the line width of LOG wirings used to transfer drive voltages.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device having a single source printed circuit board comprising:
    a liquid crystal display panel including a first data line group, a second data line group, and line-on-glass (LOG) wirings separated from the first and second data line groups;
    a first integrated circuit (IC) group operating in accordance with timing control signals, to convert digital video data into a data voltage, and to supply the data voltage to the first data line group;
    a first source printed circuit board (PCB), to which ICs included in the first IC group are coupled;
    a second IC group receiving the timing control signals and the digital video data from the first integrated circuit group via the first source PCB and the LOG wirings, and operating in accordance with the timing control signals, to convert the digital video data into the data voltage, and to supply the data voltage to the second data line group;
    a second PCB, to which ICs included in the second IC group are coupled;
    a timing controller including a single output port to output the timing control signals and the digital vide data;
    a control PCB, on which the timing controller is mounted; and
    a connector connected to the control PCB and the first source PCB, to transfer the timing control signals and the digital video data output through the single output port of the timing controller to the first source PCB,
    wherein each IC of the first and second IC groups includes a polarity control signal generator for generating a polarity control signal to control a polarity of the data voltage, using a part of the timing control signals,
    wherein the polarity control signal generator generates the polarity control signal, using a gate start pulse indicating a start horizontal line, from which a scan operation starts in one vertical period for displaying one frame, and a source output enable signal enabling the digital video data to be output,
    wherein the polarity control signal generator includes a first D-flip-flop using the source output enable signal as an input clock, the first D-flip-flop generating a first polarity control signal inverted in logic state with reference to a rising edge of the source output enable signal generated for every vertical period;
    a second D-flip-flop using the gate start pulse as an input clock, the second D-flip-flop generating a select signal inverted in logic state with reference to the rising edge of the gate start pulse generated for every vertical period; and
    a multiplexer receiving the first polarity control signal and a second polarity control signal, which has a logic value opposite to the first polarity control signal, and alternately outputting the first and second polarity control signals at intervals of one vertical period, in response to the select signal,
    wherein the multiplexer alternately selects the first and second polarity control signals at intervals of one vertical period, in response to the select signal from the second D-flip-flop, and outputs the selected signal as a final polarity control signal.

2. The liquid crystal display device having a single source printed circuit board according to claim 1, wherein:
    the first D-flip-flop includes a non-inverting output terminal and an input terminal electrically coupled to each other via an inverter; and
    the inverter receives the first polarity control signal fed back from the non-inverting output terminal of the first D-flip-flop, and outputs the fed-back signal as the second polarity control signal.

3. The liquid crystal display device having a single source printed circuit board according to claim 1, wherein the control PCB includes a voltage generator for generating a driving voltage required to drive the liquid crystal display panel.

4. The liquid crystal display device having a single source printed circuit board according to claim 3, wherein each IC of the first and second IC groups is mounted on one of a chip-on-film (COF) and a tape carrier package, on which dummy wirings for transferring the timing control signals, the digital video data, and the drive voltage are formed.

5. The liquid crystal display device having a single source printed circuit board according to claim 1, wherein the timing controller includes:
  a 2-port expander for separating digital video data RGB input at an input frequency into odd pixel data and even pixel data, and supplying the separated odd and even pixel data at a frequency corresponding to ½ of the input frequency; and
  a data modulator for modulating the odd and even pixel data from the 2-port expander, to reduce a swing width of the digital video data output from the single output port, the data modulator outputting the digital video data at a frequency corresponding to 2 times the input frequency.

6. The liquid crystal display device having a single source printed circuit board according to claim 5, wherein the data modulator modulates the digital video data in accordance with one of a mini low-voltage differential signaling (LVDS) scheme and a reduced swing differential signaling (RSDS) scheme.

7. The liquid crystal display device having a single source printed circuit board according to claim 6, wherein each of the first and second IC groups further includes a data recoverer for recovering the modulated digital video data.

* * * * *